(12) United States Patent
White et al.

(10) Patent No.: US 6,703,974 B2
(45) Date of Patent: Mar. 9, 2004

(54) ANTENNA SYSTEM HAVING ACTIVE POLARIZATION CORRELATION AND ASSOCIATED METHOD

(75) Inventors: Geoffrey O. White, Kent, WA (US); Shashi M. Sanzgiri, Burien, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/102,301

(22) Filed: Mar. 20, 2002

(65) Prior Publication Data

US 2003/0179137 A1 Sep. 25, 2003

(51) Int. Cl.[7] .......................... H01Q 21/24; H01Q 3/26
(52) U.S. Cl. .................................. 342/361; 342/368
(58) Field of Search .................... 342/361, 368–384; 455/295, 63.3, 278.1

(56) References Cited

U.S. PATENT DOCUMENTS

| | | | |
|---|---|---|---|
| 3,883,872 A | * 5/1975 | Fletcher et al. | 342/363 |
| 4,005,425 A | * 1/1977 | Nagy | 342/361 |
| 4,023,172 A | * 5/1977 | Schmidt | 342/380 |
| 4,044,359 A | 8/1977 | Applebaum et al. | |
| 4,090,137 A | 5/1978 | Soma et al. | |
| 4,220,923 A | 9/1980 | Pelchat et al. | |
| 4,283,795 A | 8/1981 | Steinberger | |
| 4,292,685 A | 9/1981 | Lee | |
| 4,438,530 A | 3/1984 | Steinberger | |
| 4,456,913 A | * 6/1984 | Rao et al. | 342/361 |
| 4,479,258 A | 10/1984 | Namiki | |
| 4,499,473 A | * 2/1985 | Rao | 342/372 |
| 4,532,519 A | 7/1985 | Rudish et al. | |
| 4,577,330 A | 3/1986 | Kavehrad | |
| 4,606,054 A | 8/1986 | Amitay et al. | |
| 4,631,734 A | 12/1986 | Foschini | |
| 4,637,067 A | 1/1987 | Steinberger | |
| 4,723,321 A | 2/1988 | Saleh | |
| 4,972,199 A | 11/1990 | Raghavan et al. | |
| 4,989,011 A | 1/1991 | Rosen et al. | |
| 5,027,124 A | 6/1991 | Fitzsimmons et al. | |
| 5,038,150 A | 8/1991 | Bains | |
| 5,130,715 A | 7/1992 | Yanagisawa | |
| 5,231,405 A | 7/1993 | Riza | |
| 5,283,587 A | 2/1994 | Hirshfield et al. | |
| 5,294,934 A | 3/1994 | Matsumoto | |
| 5,304,999 A | 4/1994 | Roberts et al. | |
| 5,434,575 A | 7/1995 | Jelinek et al. | |
| 5,442,663 A | 8/1995 | Andersen et al. | |

(List continued on next page.)

Primary Examiner—Thomas H. Tarcza
Assistant Examiner—F H Mull
(74) Attorney, Agent, or Firm—Alston & Bird LLP

(57) ABSTRACT

An antenna system and an associated method are provided that are capable of providing improved cross-polarization isolation, thereby negating the otherwise deleterious effects of cross-coupling between orthogonally polarized signals that occur within a dual orthogonally polarized antenna, such as a phased array antenna. Thus, the antenna system can more reliably transmit and/or receive dual orthogonally polarized signals over a wide range of elevation and azimuth scan angles.

18 Claims, 7 Drawing Sheets

U.S. PATENT DOCUMENTS

| | | |
|---|---|---|
| 5,495,502 A | 2/1996 | Andersen |
| 5,504,493 A | 4/1996 | Hirshfield |
| 5,512,906 A | 4/1996 | Speciale |
| 5,530,449 A | 6/1996 | Wachs et al. |
| 5,543,805 A | 8/1996 | Thaniyavarn |
| 5,548,813 A | 8/1996 | Charas et al. |
| 5,579,016 A | 11/1996 | Wolcott et al. |
| 5,659,322 A | 8/1997 | Caille |
| 5,710,799 A | 1/1998 | Kobayashi |
| 5,712,641 A | 1/1998 | Casabona et al. |
| 5,751,248 A | 5/1998 | Thaniyavarn |
| 5,760,740 A | 6/1998 | Blodgett |
| 5,844,950 A | 12/1998 | Aono et al. |
| 5,872,540 A * | 2/1999 | Casabona et al. ........... 342/379 |
| 5,886,671 A | 3/1999 | Riemer et al. |
| 5,905,462 A | 5/1999 | Hampel et al. |
| 5,905,574 A | 5/1999 | Vollbrecht et al. |
| 5,929,809 A | 7/1999 | Erlick et al. |
| 5,940,030 A | 8/1999 | Hampel et al. |
| 6,008,760 A | 12/1999 | Shattil |
| 6,028,562 A | 2/2000 | Guler et al. |
| 6,028,563 A | 2/2000 | Higgins |
| 6,067,053 A | 5/2000 | Runyon et al. |

\* cited by examiner

ANTENNA SYSTEM HAVING ACTIVE POLARIZATION CORRELATION AND ASSOCIATED METHOD

FIELD OF THE INVENTION

The present invention relates generally to antennas and associated methods for communication and, more particularly, to antennas systems having active polarization correction and associated communication methods.

BACKGROUND OF THE INVENTION

Antennas are widely utilized in order to transmit and receive a variety of signals. For example, antennas are widely utilized in radio frequency communication systems. Radio frequency antennas are commonly capable of simultaneously transmitting and/or receiving signals having different polarizations, such as orthogonally polarized signals, in order to increase the transmission and/or reception capacity of the antenna. In order to effectively transmit and/or receive signals that are orthogonally polarized, an antenna must have relatively high polarization purity such that there is minimal interference between the orthogonally polarized signals. In some applications, for example, the required cross-polarization isolation may be 30 dB or more.

One common type of antenna utilized for high-data rate Communications with moving platforms is a phased array antenna. Among other advantages, phased array antennas are capable of communicating simultaneously with two or more spatially separate sources. In addition, phased array antennas are relatively easy to install, operate and maintain on moving platforms such as aircraft, ships and motor vehicles since they generally have a relatively low profile, are capable of rapidly tracking and have no moving parts.

Phased array antennas generally include a number of identical radiating elements and a beam former connected to the radiating elements. Each element may include a phase shifter and/or a time delay circuit. In addition, each element may include an amplifier, if desired. In one phased array antenna, each element includes a phase shifter and groups of elements are interconnected by a time delay circuit. By adjusting the phase shift of each element and the time delay of each group of elements, the beam transmitted and/or received by the phased array antenna may be formed electronically and steered without physical movement of the antenna aperture over a wide instantaneous bandwidth. Moreover, by incorporating multiple beam formers and multiple phase shifters and time delay circuits associated with each radiating element, a phased array antenna that is capable of forming multiple simultaneous independent beams may be constructed.

Phase array antennas are capable of transmitting and/or receiving signals having any desired polarization. In this regard, a schematic representation of the architecture of a phased array antenna capable of sensing signals having either circular polarization or arbitrarily oriented linear polarization is shown in FIG. 1. A phased array antenna having the architecture depicted in FIG. 1 includes a plurality of modules 1, each of which includes two amplifiers 2 connected to the orthogonal radiating elements 3. The output of each amplifier connected to a 90° hybrid 4 which forms left circular polarization out of one port and right circular polarization out of the other port. Each port is connected to a phase shifter 5 which, in turn, is connected to an independent beam forming network 6. The output of each beam former is therefore a left or right circularly polarized (CP) beam that is redirected independently of the other beam. A phased array antenna having the construction depicted in FIG. 1 may also operate in a linearly polarized (LP) mode. In this mode, the two beams are co-pointed and the beam former outputs are recombined in a quadrature hybrid 7 to recover two orthogonal linear polarizations from a single source. By controlling the two phase shifts 5 to have a constant offset therebetween, the two orthogonal linear polarization axes may be spatially rotated so as to be aligned with the polarization axes of a source, such as a satellite that radiates orthogonal linearly polarized signals Although phased array antennas offer a number of advantages, phased array antennas, in particular, and electronically scanned antennas, in general, are typically unable to provide the degree of polarization purity over the entire range of scan angles as that provided by at least some mechanically scanned antennas. The limitations with respect to the polarization purity of electronically scanned antennas are created by construction constraints within the modules, inherent radiating element cross-polarization characteristics and the active impedance to which a module is subjected once a module is placed in an array. Notably, this disadvantageous cross-polarization coupling between signals having orthogonal polarizations is within the antenna itself and is independent of any cross-coupling between signals having orthogonal polarizations that may occur in the propagation medium.

For signals transmitted and/or received in a near broadside direction, the cross-polarization isolation is determined largely by the degree of cross-coupling between orthogonal radiating elements. While phased array antennas can be constructed with near broadside polarization isolation approaching that of mechanically scanned antennas, the cost of the modules that must be constructed generally increases substantially. Unfortunately, as the scan angle increases away from broadside, the cross-polarization isolation degrades due to divergence between the E and H-plane active impedances seen by each module in the array. The degree of divergence typically increases monotonically with elevation scan and varies smoothly and periodically with azimuth scan. At an elevation scan of 60°, for example, the degree of degradation of the cross-polarization isolation relative to that provided near broadside will vary as the antenna is scanned in an azimuthal direction by as much as 10 dB. The internal coupling between the orthogonally polarized signals within an antenna 20 may be graphically depicted as shown in FIG. 2. In this regard, the antenna is represented by the combination of two blocks, one block 22 depicting an ideal antenna having no internal coupling between the orthogonally polarized signals and another block 24 depicting the internal coupling between the orthogonally polarized signals. As will be apparent, although the antenna is depicted for purposes of discussion as being separated into two boxes, the antenna cannot physically be separated in the same manner as the internal coupling between the orthogonally polarized signals is inherent within the antenna as a result of its construction and design.

Referring to FIG. 2, the antenna 20 includes a pair of terminals 26 and at least one pair of orthogonally polarized radiating elements 28. In the transmission mode, two orthogonally polarized signals $T_1$ and $T_2$ are presented at the antenna terminals and are amplified by the ideal antenna 22 by a gain designated A. These amplified signals are then subjected to undesirable cross-polarization coupling as represented by block 24. As indicated within block 24, the ratio of the cross-coupled voltage to the signal voltage is designated $\delta$. As such, the signals transmitted by the dual orthogonally polarized radiating element are not merely the amplified inputs designated $AT_1$ and $AT_2$, but are instead more complex signals in which each signal includes components having both polarizations. In the illustrated example, the radiating element designed to radiate signals having the first polarization $p_1$ actually radiates a signal defined as $A[T_1(1-\delta^2)^{1/2}\hat{p}_1+\delta T_2\hat{p}_2]$, while the radiating element designed to radiate signals having the second polarization $p_2$ actually radiates a signal represented as $A[\delta T_1\hat{p}_1+(1-\delta^2)^{1/2}T_2\hat{p}_2]$.

Similarly, in the reception mode, dual orthogonally polarized signals are presented to the dual orthogonally polarized radiating elements 28 as designated $R_1\hat{p}_1$ and $R_2\hat{p}_2$. Instead of being merely amplified by the antenna and presented at the antenna terminals 26, the internal cross-polarization coupling causes each of the signals to include components having both polarizations. As such, the signals actually presented to the antenna terminals are represented as $A[R_1(1-\delta^2)^{1/2}+\delta R_2]$ and $A[\delta R_1+(1-\delta^2)^{1/2}R_2]$.

Several techniques have been developed to improve the polarization purity of phased array antennas at high scan angles. Each technique attempts to improve the polarization purity in a passive manner and is somewhat effective, although practical limitations generally prevent the desired degree of polarization purity from being achieved.

One technique to improve polarization purity is to reduce the spacing between radiating elements. The degree to which the spacing between radiating elements may be reduced is limited, however, by packaging issues and by a loss in the gain that the radiating elements may provide that results from a decrease in the spacing. In this regard, the area available in which to package the phase shift and amplification circuitry decreases proportional to the square of the decrease in element spacing. The spacing between radiating elements for wide scan performance must be less than $0.577\lambda$, where $\lambda$ is the wavelength of the signals transmitted and/or received by the antenna. Particularly at frequencies above 10 GHz, however, it is difficult and expensive to appreciably decrease the spacing between the radiating elements to less than $0.577\lambda$, especially in packaging schemes that are relatively thin and planar. By incorporating a vertical packaging architecture, the spacing between the radiating elements may be decreased somewhat more, but only at the expense of a generally disadvantageous increase in the thickness of the antenna. As the radiating elements become more closely spaced, the gain which each radiating element is capable of providing also decreases. This decrease in the gain that each radiating element is capable of providing may require that the number of radiating elements be increased in order to provide the same overall intended performance, i.e., Gain to noise temperature (G/T) for reception antennas and Effective Isotropic Radiated Power (EIRP) for transmission antennas. As will be apparent, an increase in the number of radiating elements correspondingly increases the cost of the antenna and, with respect to phased array antennas, also increases the power consumption of the antenna. Accordingly, high polarization purity cannot be obtained as a practical matter at high scan angles simply by reducing the spacing between the radiating elements.

Another technique to improve the polarization purity of electronically scanned antennas, such as phased array antennas, is to provide a wide angle impedance (WAIM) layer that is disposed over the radiating elements. A WAIM layer is constructed from a plurality of dielectric layers that serve to improve the cross-polarization isolation at relatively high scan angles. Unfortunately, the number of dielectric layers that would be required in order to effectively suppress cross-polarization coupling over an azimuth scan of 360° far exceeds the number that may be practically employed.

Even those phased array antennas, having a relatively small spacing between the radiating elements and including a WAIM layer are unable to provide sufficient cross-polarization isolation at some of the scan angles for some applications. For example, a phased array antenna capable of providing cross-polarization isolation in the broadside direction approaching 28 dB may generally only be able to provide cross-polarization isolation of about 15 dB at an elevation scan angle of 60° and at the worst case azimuth angle. As such, it would be desired to provide an antenna system which provides enhanced polarization isolation between signals transmitted and/or received having orthogonal polarizations.

SUMMARY OF THE INVENTION

An antenna system and an associated method are provided that are capable of providing improved cross-polarization isolation, thereby negating the otherwise deleterious effects of cross-coupling between orthogonally polarized signals that occur within a dual orthogonally polarized antenna, such as a phased array antenna. Thus, the antenna system can more reliably transmit and/or receive dual orthogonally polarized signals over a wide range of elevation and azimuth scan angles.

The antenna of one advantageous embodiment includes a dual orthogonally polarized antenna, such as a phased array antenna, capable of supporting propagation of signals having two orthogonal polarizations. The antenna permits different predetermined amounts of internal coupling between the orthogonally polarized signals at different scan angles. The antenna system of this embodiment also includes a cross-polarization cancellation element associated with the antenna for modifying the orthogonally polarized signals to compensate for the internal coupling. The cross-polarization cancellation element modifies the orthogonally polarized signals at different scan angles based on the different predetermined amounts of internal coupling between the orthogonally polarized signals at different scan angles.

The antenna system may also include a processor for directing the cross-polarization cancellation element to provide appropriate modifications to the orthogonally polarized signals and a memory device, accessible by the processor, for storing data representing modifications to be provided by the cross-polarization cancellation element to the orthogonally polarized signals at different scan angles. In addition to variances based upon the scan angle, the data stored by the memory device may also be dependent upon the frequency of the orthogonally polarized signals.

In embodiments in which the dual orthogonally polarized antenna is a phased array antenna, the phased array antenna may include a pair of input/output ports for providing signals having a respective polarization. As such, the cross-polarization cancellation element of one embodiment may be connected to the pair of input/output ports. The phased array antenna also includes a plurality of modules, each including a pair of dual orthogonally polarized radiating elements. As such, the cross-polarization element need not be connected to the pair of input/output ports of the phased array antenna. Instead, the antenna system of another embodiment may include a plurality of cross-polarization cancellation elements associated with respective modules of the phased array antenna.

In one embodiment in which the cross-polarization cancellation element is connected to the input/output ports of one antenna, the cross-polarization cancellation element includes a first leg extending from the first input/output port to the second input/output port, and a second leg extending from the second input/output port to the first input/output port. Each leg includes an adjustable amplifier and an adjustable phase shifter for controllably adjusting the amplitude and phase, respectively, of the signals diverted from one input/output port to the other input/output port. By appropriately adjusting the amplitude and phase, the internal coupling between the orthogonally polarized signals that is permitted by the antenna may be corrected.

According to another embodiment in which the cross-polarization cancellation element is connected to the input/output ports of the antenna, the cross-polarization cancellation element includes first and second legs connected to the first and second input/output ports, respectively. Each leg includes an adjustable, i.e., variable gain, amplifier or an adjustable attenuator (hereinafter generally termed an adjustable amplifier) and an adjustable phase shifter for controllably adjusting the amplitude and phase, respectively, of the signals at the respective input/output port. In addition, the first and second legs of the cross-polarization cancellation element may include at least one quadrature hybrid connected between the legs. By appropriately adjusting the amplitude and phase of the signals, the cross-polarization cancellation element may similarly compensate for the internal coupling between the orthogonally polarized signals. Thus, the antenna system of the foregoing embodiments provide open loop control of the cross-polarization coupling.

The antenna system of another embodiment includes both a reception antenna for receiving signals having two orthogonal polarizations and a transmission antenna for transmitting signals having two orthogonal polarizations. Both the reception antenna and the transmission antenna may be phased array antennas. In addition, both the reception antenna and the transmission antenna permit internal coupling between the orthogonally polarized signals. The antenna system of this embodiment also includes first and second cross-polarization cancellation elements associated with the reception and transmission antennas, respectively, for modifying the orthogonally polarized signals to compensate for the internal coupling. Each cross-polarization cancellation element includes a delta port and a sum port. In addition, each cross-polarization cancellation element includes at least one phase shifter for modifying the phase of at least some of the orthogonally polarized signals. Each cross-polarization cancellation element may also include an adjustable amplifier for controllably adjusting the amplitude of at least some of the orthogonally polarized signals.

According to this embodiment, the antenna system also includes a processor for setting the phase shift and the amplitude imparted by at least one phase shifter and the amplifier of the first cross-polarization cancellation element, respectively, typically in an iterative manner, such that a null is provided at the delta port. The processor then sets at least one phase shifter and amplifier of the second cross-polarization cancellation element to impart the same phase shift and amplification, respectively. Thus, the antenna system of this embodiment effectively employs closed loop feedback in order to compensate for the internal coupling between the orthogonally polarized signals permitted by the reception and transmission antennas.

The antenna of this embodiment may include first and second input/output ports for providing signals having a respective polarization. As such, each cross-polarization cancellation element is connected to the first and second input/output ports of the respective antenna. Each cross-polarization cancellation element may include the first and second legs connected to the first and second input/output ports, respectively, of the respective antenna. Each leg includes an adjustable amplifier and an adjustable phase shifter for controllably adjusting the amplitude and phase, respectively, of the signals at the respective input/output port. The first and second legs of each cross-polarization cancellation element of this embodiment may also include at least one quadrature hybrid connected therebetween such that the cross-polarization cancellation element may compensate for the internal coupling between the orthogonally polarized signals that is permitted by the respective antenna.

In operation, orthogonally polarized signals may be received by the reception antenna with the phase of the received signals then being selectively shifted and, in advantageous embodiments, the amplitude of the received signals also being selectively adjusted such that a null is provided at the delta port of the cross-polarization cancellation element. The phase shift and, in advantageous embodiments, the amplitude adjustment imparted upon the transmitted signals is then set to be equal to the phase shift and the adjustment in amplitude imparted upon the received signals. The orthogonally polarized signals may then be transmitted via the transmission antenna with the phase shift and amplitude adjustment compensating for the internal coupling between the orthogonally polarized signals that is permitted by the transmission antenna.

Accordingly, the antenna system and associated method of the present invention provide active correction for internal coupling between the orthogonally polarized signals permitted by the dual orthogonally polarized antenna, such as a phased array antenna. As such, the antenna can transmit and/or receive dual orthogonally polarized signals across a full range of scan angles without concern as to the degradation of the polarization purity of the signals. Additionally, the antenna system of the present invention provides active polarization correction without substantially increasing the cost of the antenna system and without significantly impacting the size or packaging requirements of the antenna. Nevertheless, the antenna system of the present invention can be used with any of the conventional passive measures described herein, to provide additional polarization purity.

DETAILED DESCRIPTION OF THE
PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to the present invention, an antenna system 30 and an associated method are provided for correcting or otherwise providing compensation for undesirable cross-polarization coupling within an antenna. While the antenna system of the present invention may include a wide variety of dual orthogonally polarized antennas 32, the antenna system of the present invention generally includes a dual orthogonally polarized antenna that is electronically steerable, such as a phased array antenna. As explained below in detail, the cross-polarization cancellation provided by the antenna system and method of the present invention can be considered to pre-depolarize signals that are otherwise presented in orthogonally polarized form to the antenna. As these pre-depolarized signals pass through the antenna, the cross-polarization coupling inherent in the antenna will essentially restore the pre-depolarized signals to being orthogonally polarized. As will be apparent, this technique is equivalent to injecting a portion of the undesirable, cross-polarized signal into a co-polarized channel with the undesirable cross-polarized signal having the proper amplitude relationship to and being out of phase with the undesired signal. Moreover, the cross-polarization cancellation provided by the antenna system and method of the present invention may be employed individually or in combination with one or more passive techniques for providing cross-polarization cancellation, such as the reduction in the spacing of the dual orthogonally polarized radiating elements or the addition of a WAIM layer over the radiating elements.

Figure 1:
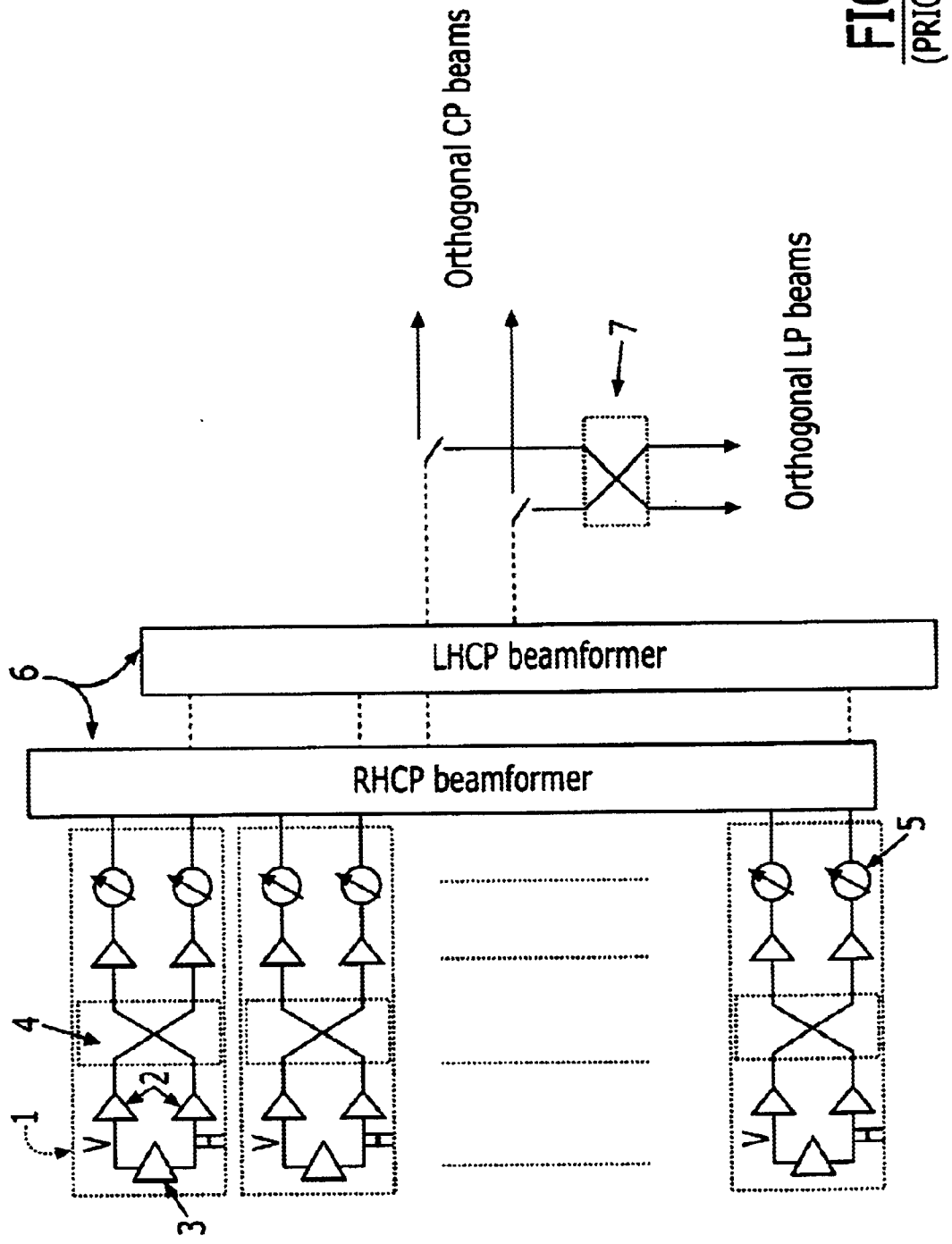
FIG. 1 is a schematic representation of a module of a conventional phased array antenna.
Figure 2:
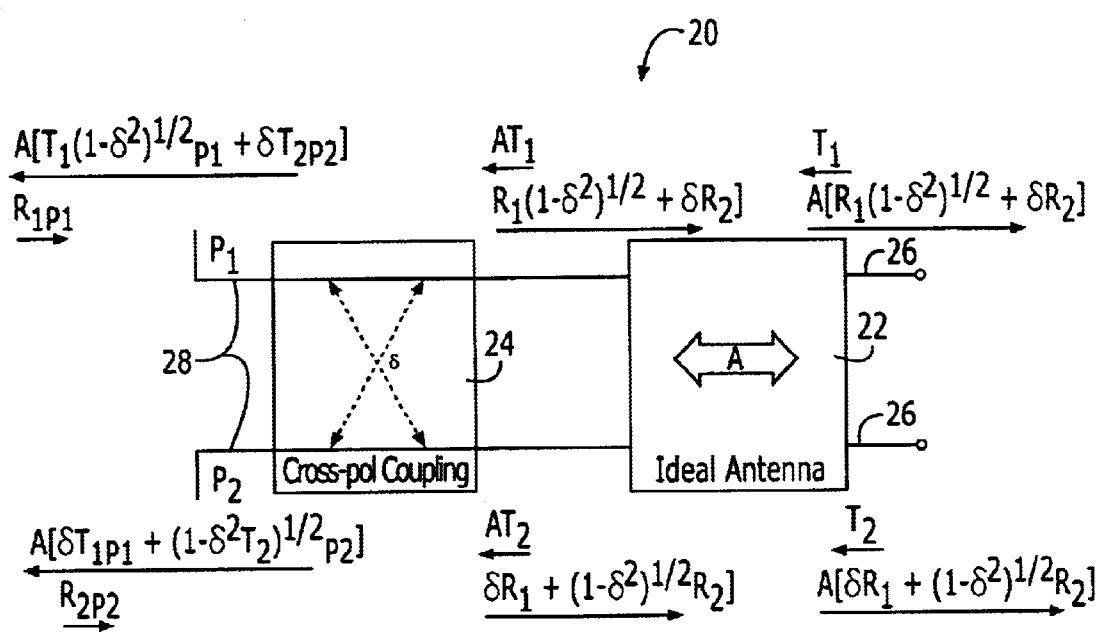
FIG. 2 is a block diagram illustrating the impact of spurious cross-polarization upon an ideal antenna.
Figure 3:
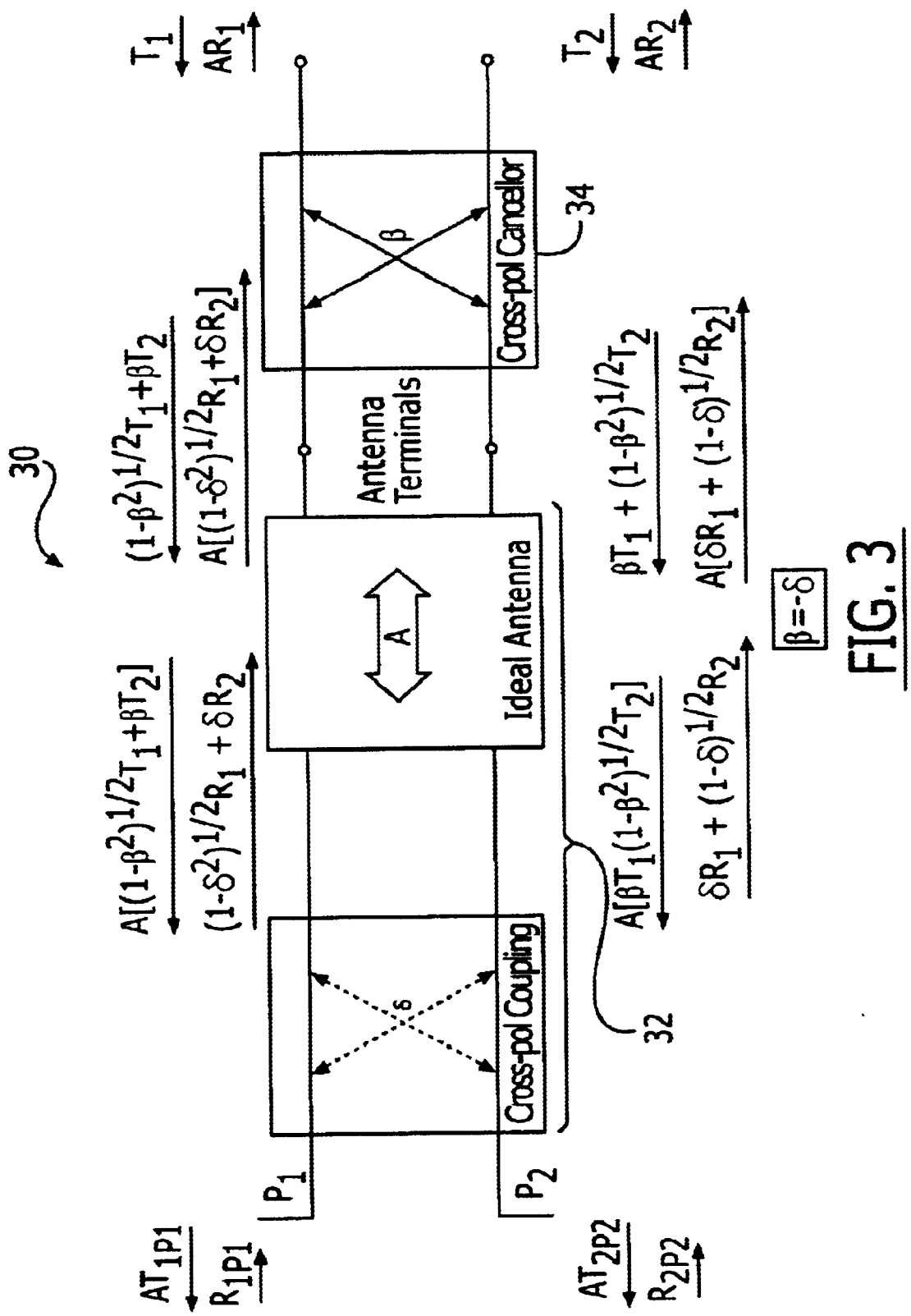
FIG. 3 is a block diagram representing the cross-polarization cancellation provided by the antenna system and method of one embodiment to the present invention.

In addition to the dual orthogonally polarized antenna 32, the antenna system 30 of the present invention includes a cross-polarization cancellation element 34 associated with the antenna. The cross-polarization cancellation element modifies the orthogonally polarized signals to compensate for internal coupling between the orthogonally polarized signals. As noted above, this internal cross-polarized coupling occurs within the antenna and is independent of any cross-polarization coupling that may occur in the propagation medium or elsewhere in the communications system. As shown in FIG. 3, the cross-polarization cancellation element may be depicted as an addition to the antenna system otherwise depicted in FIG. 2. In this regard, the dual orthogonally polarized antenna may be represented as an ideal antenna having no internal cross-polarization coupling and a block representing the cross-polarization coupling permitted by the dual orthogonally polarized antenna. As described above in conjunction with FIG. 2, this cross-polarization coupling causes the signals transmitted and/or received by the antenna to no longer be of a single polarization, but instead to have components of both orthogonal polarizations. According to the present invention and as explained in more detail below, the cross-polarization cancellation element offsets the internal cross-polarization coupling permitted within the antenna such that the signals transmitted and/or received by the antenna system are orthogonally polarized with little, if any, cross-coupling therebetween.

In the illustrated embodiment (FIG. 3) in which the internal cross-polarization coupling permitted by the antenna 32 has complex number designation δ, the cross-polarization cancellation element preferably injects a signal having having complex designation β that is related to δ as follows:

$$\beta = -\delta \tag{1}$$

For a dual orthogonally polarized antenna 32 having internal cross-polarization coupling represented by δ, the internal cross-polarization coupling can be represented by the polarization matrix C as follows:

$$C = \begin{bmatrix} (1-\delta^2)^{1/2} & \delta \\ \delta & (1-\delta^2)^{1/2} \end{bmatrix} \tag{2}$$

In the embodiment in which the cross-polarization coupling permitted by the cross-polarization cancellation element 34 is equal and opposite to the internal cross-polarization coupling permitted by the antenna 32, orthogonally polarized signals provided to the antenna for transmission are initially subjected to cross-polarization coupling by the cross-polarization cancellation element and are then amplified and subjected to internal cross-polarization coupling as shown in FIG. 3 such that the signals actually transmitted by the antenna are amplified and remain orthogonally polarized. Similarly, orthogonally polarized signals received by the antenna are amplified and are subjected to both the internal cross-polarization coupling and the equal and opposite cross-polarization coupling provided by the cross-polarization cancellation element such that the resulting signals that appear at the terminals of the antenna are orthogonally polarized. Thus, the signals that are transmitted and/or received by the antenna system do not include components of both polarizations, but are instead orthogonally polarized.

Since the cross-polarization provided by the cross-polarization cancellation element 34 is equal and opposite to the internal cross-polarization coupling permitted by the antenna 32, the cross-polarization provided by the cross-polarization cancellation element may be represented by a cross-polarization compensation matrix D as follows:

$$D = \frac{1}{1-2\delta^2} \begin{bmatrix} (1-\delta^2)^{1/2} & -\delta \\ -\delta & (1-\delta^2)^{1/2} \end{bmatrix} \tag{3}$$

Figure 4:
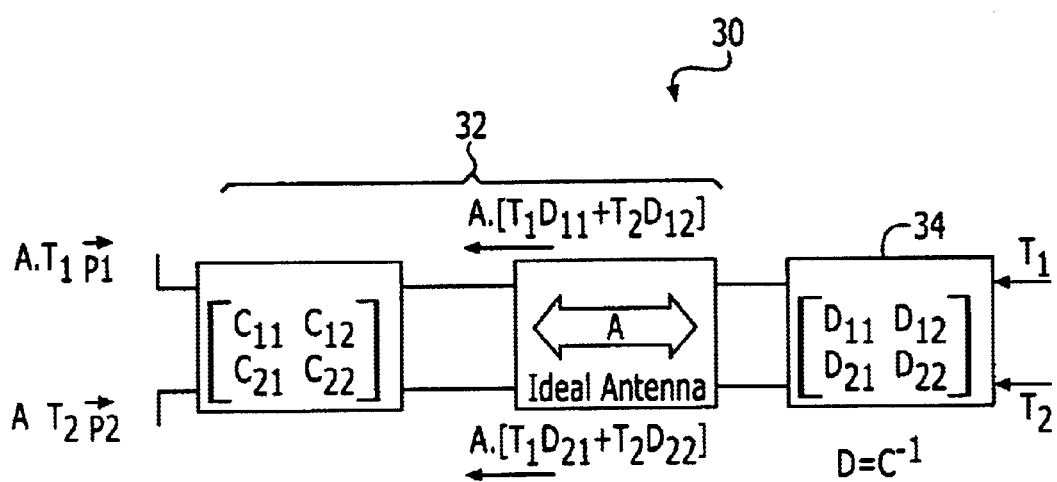
FIG. 4 is another block diagram representation of the cross-polarization cancellation provided by the antenna system and method of one embodiment of the present invention in which the cross-polarization coupling and the cross-polarization correction are represented by matrices.

As such, FIG. 3 can be redrawn as shown in FIG. 4 in which the cross-polarization coupling is represented by respective matrices.

The cross-polarization cancellation element 34 may be applied at the antenna terminals as shown in FIGS. 3 and 4 or to the individual modules of a phased array antenna. By applying the cross-polarization cancellation to the antenna terminals, the antenna 32 will need to have signals having both polarizations available at the terminals For a phased array antenna, the antenna will therefore generally be required to have two beam formers, one associated with each antenna terminal. Applying the cross-polarization cancellation to each module would eliminate the requirement of having two beam forming networks, but would require a plurality of cross-polarization cancellation elements, one of which is associated with each module of the phased array antenna. Generally, the cross-polarization cancellation element will be applied at the antenna terminals and the antenna system 30 and method of the present invention will therefore be described in conjunction with antenna systems having a cross-polarization cancellation element applied at the antenna terminals for purposes of illustration and explanation, but not of limitation.

Figure 5:
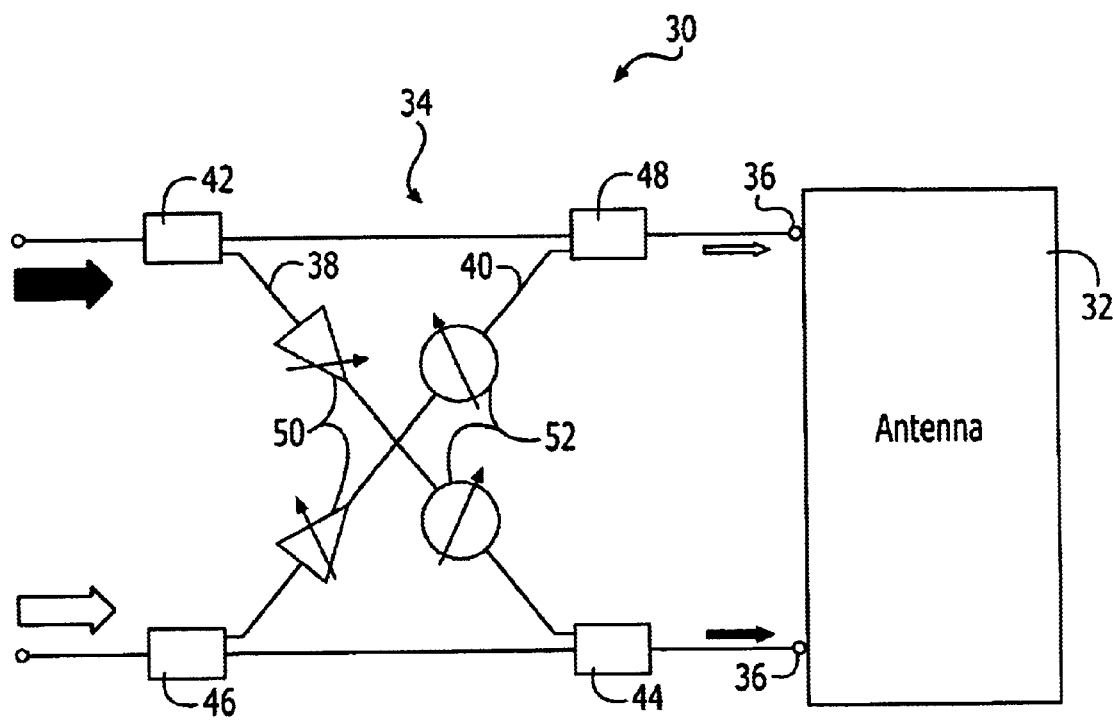
FIG. 5 is a representation of an antenna system according to one embodiment of the present invention.

An antenna system 30 according to one embodiment of the present invention is depicted in FIG. 5. As shown, the antenna system includes a dual orthogonally polarized antenna 32 having a pair of input/output ports 36. In the reception mode, the antenna is adapted to receive signals having a first polarization via a first port and signals having a second orthogonal polarization via a second port. Conversely, in the transmission mode, the antenna is adapted to provide signals having a first polarization via the first port and signals having a second orthogonal polarization via the second port. According to this embodiment, the cross-polarization cancellation element 34 includes a first leg 38 that extends from the first port to the second port, and a second leg 40 extending from the second port to the first port. The first and second legs may be connected to the respective ports by means of directional couplers. As such, a predetermined portion of the signals otherwise available at the first port is diverted via the first leg by a first directional coupler 42 and is then added to the signals available at the second port by a second directional coupler 44. Similarly, a portion of the signals otherwise available at the second port are diverted via the second leg by a third directional coupler 46 and are then added to the signals available at the first port by a fourth directional coupler 48. As shown in FIG. 5, each leg includes an adjustable gain amplifier 50 and an adjustable phase shifter 52 for controllably adjusting the amplitude and phase, respectively, of the signals diverted from one port to the other port. By appropriately adjusting the amplitude and phase of the diverted signals, the cross-polarization cancellation element effectively compensates for the internal cross-polarization coupling between the orthogonally polarized signals that is permitted by the antenna.

Typically, the antenna system 30 includes a processor, a controller or the like for controllably setting the amplification and the phase shift of the diverted signals such that the amplitude and phase of the cross-polarization correction is equal and opposite to the internal cross-polarization coupling permitted by the antenna 32. As described above, the internal cross-polarization coupling permitted by the antenna may repeatably vary based upon the scan angle and the frequency of the signals. As such, appropriate settings for the amplitude and phase shift of the diverted signals may be determined in advance for a variety of scan angles and frequencies, such as at an antenna measurement range, and stored in a memory device or the like. As such, once the antenna system is placed in operation for transmitting signals of a particular wavelength and at a particular scan angle, the processor, controller or the like may recall the appropriate amplitude and phase adjustment to be provided by the cross-polarization cancellation element in order to offset or compensate for the internal cross-polarization coupling between the orthogonally polarized signals permitted by the antenna.

Figure 6:
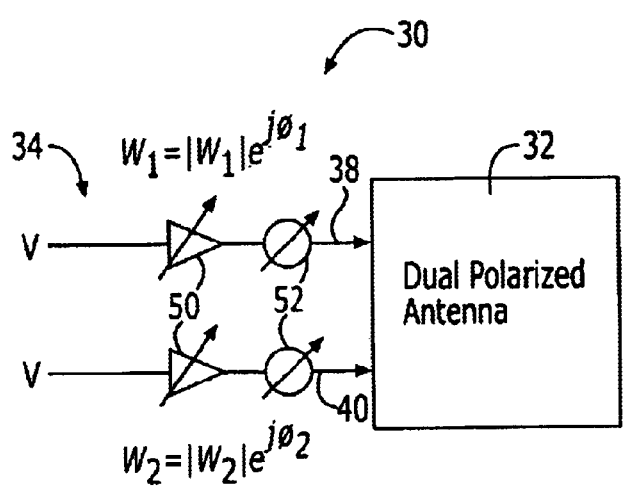
FIG. 6 is a representation of an antenna system according to another embodiment of the present invention.

A more general representation of an antenna system 30 including a cross-polarization cancellation element 34 according to the present invention is depicted in FIG. 6. As described above in conjunction with FIG. 5, the cross-polarization correction element is connected to the antenna terminals or ports. In this regard, the cross-polarization cancellation element can include first and second legs 38, 40 connected to the first and second ports, respectively. Each leg again includes an adjustable attenuator or amplifier 50, and an adjustable phase shifter 52 for controllably adjusting the amplitude and phase, respectively, of the signals at the respective ports. As indicated by FIG. 6, the adjustable attenuator or amplifier and adjustable phase shifter of each leg are adapted to collectively apply a complex weight to the signals otherwise available at the respective ports, in this case a common signal V. In this regard, the adjustable attenuator or amplifier and adjustable phase shifter of the first leg weight the signals at the first port by complex weight $W_1$ and the adjustable amplifier and the adjustable phase shifter of the second leg weights the signals at the second port by complex weight $W_2$ wherein $W_1$ and $W_2$ are defined as follows:

$$W_1 = |W_1| e^{j\phi_1}$$

$$W_2 = |W_2| e^{j\phi_2} \quad (4)$$

wherein $|W_1|$ and $|W_2|$ are magnitudes and $\phi_1$ and $\phi_2$ are phases of complex weights $W_1$ and $W_2$ respectively. The complex weights are based upon the elements of the cross-polarization cancellation matrix designated $d_{11}, d_{12}, d_{21}$ and $d_{22}$, and the orthogonally polarized signals $T_1$ and $T_2$ that are desired in order to effectively offset the internal cross-polarization coupling permitted by the antenna 32. With reference to FIGS. 3 and 4, the complex weights $W_1$ and $W_2$ can therefore be defined as follows:

$$W_1 = T_1 d_{11} + T_2 d_{12}$$

$$W_2 = T_1 d_{21} + T_2 d_{22} \quad (5)$$

As described above in conjunction with the embodiment of FIG. 5, the complex weights $W_1$ and $W_2$ generally vary depending upon the scan angle and the frequency of the signals transmitted and/or received by the antenna 32. As such, appropriate values for the complex weights may be determined in advance for each scan angle and frequency of interest. These predetermined complex weights may be stored in a memory device. As such, the antenna system 30 may also include a processor, a controller or the like for accessing the memory device and obtaining the appropriate complex weights based upon the current scan angle and the current frequency of the signals being transmitted and/or received by the antenna and thereafter appropriately adjusting the amplitude and phase of the signals at the first and second ports of the antenna.

Figure 7:
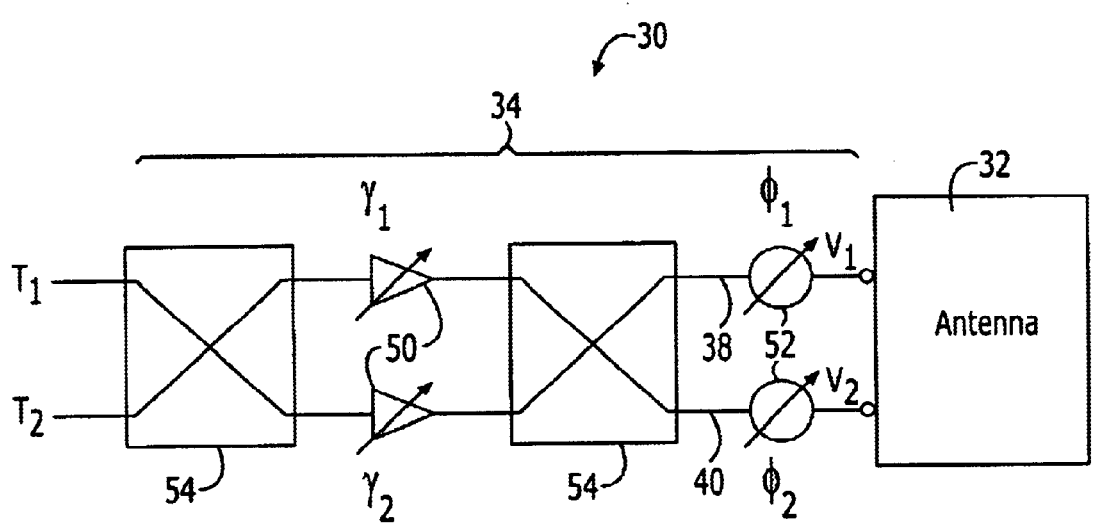
FIG. 7 is a representation of an antenna system according to yet another embodiment of the present invention.

The antenna system 30 of yet another embodiment is depicted in FIG. 7 which is capable of readily applying the complex weights to the signals at the first and second ports of the antenna 32. In instances in which the antenna is designed to transmit dual orthogonal polarized signals, designated $T_1$ and $T_2$, a cross-polarization cancellation element 34 may be designed to receive the dual orthogonal polarized signals $T_1$ and $T_2$ and to provide signals $V_1$ and $V_2$ to the first and second ports, respectively, of the antenna. In this regard, the relationship between the signals provided by the cross-polarization correction element to the first and second ports of the antenna and the original dual orthogonal polarized signal is defined as follows:

$$V_1 = c[T_1 \cos(\gamma/2) + T_2 \sin(\gamma/2)] e^{j\phi_1}$$

$$V_2 = c[T_1 \sin(\gamma/2) + T_2 \cos(\gamma/2)] e^{j\phi_2} \quad (6)$$

wherein c is a constant and $\gamma=\gamma_2-\gamma_1$. As explained herein below, $\gamma$ effectively controls the relative amplitude of the signals while $\phi=\phi_2-\phi_1$ effectively controls the relative phase between the signals.

In the embodiment of FIG. 7, the cross-polarization cancellation element 34 again includes first and second legs 38, 40 connected to the first and second ports, respectively, of the antenna 32. Each leg includes an adjustable phase shifter 52 for controllably adjusting the relative phase $\phi$ of the signals at the respective port. In addition, each leg includes an adjustable amplifier $\gamma$ 50 for controllably adjusting the relative amplitude between the two signals at the array input ports. In addition, the first and second legs of the cross-polarization cancellation element include at least one and, more preferably, a pair of quadrature hybrids 54 connected therebetween. In the illustrated embodiment, for example, a cross-polarization correction element includes a first quadrature hybrid having a pair of inputs to which the input signals $T_1$ and $T_2$ are applied and a pair of outputs connected to the adjustable phase shifters of the first and second legs, respectively. Additionally, the cross-polarization correction element of the illustrated embodiment includes a second quadrature hybrid connected between the adjustable amplifiers and the adjustable phase shifters of the first and second legs. By comparison of equations (5) and (6), the cross-polarization cancellation matrix D may be rewritten to more precisely define the cross-polarization provided by the cross-polarization cancellation element 34 of FIG. 7 as follows:

$$D = c \begin{bmatrix} \cos(\gamma/2)e^{j\phi_1} & \sin(\gamma/2)e^{j\phi_1} \\ \sin(\gamma/2)e^{j\phi_2} & \cos(\gamma/2)e^{j\phi_2} \end{bmatrix} \quad (7)$$

Figure 8:
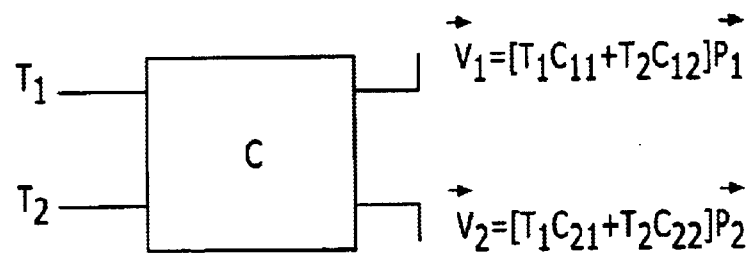
FIG. 8 is a representation of the relationship between the input and output of dual orthogonally polarized antennas which mathematically defines the internal coupling between the orthogonally polarized signals.
Figure 9:
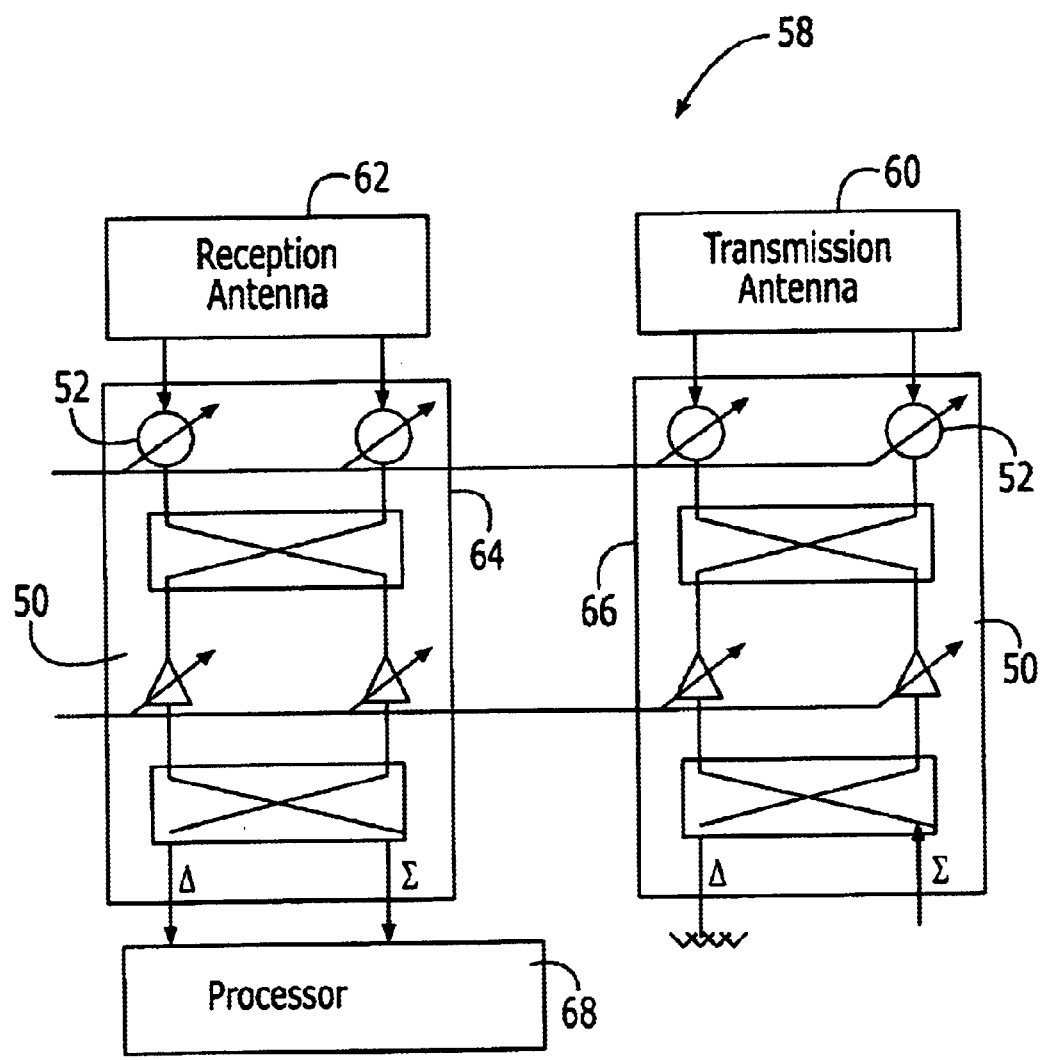
FIG. 9 is a block diagram representing an antenna system according to a further embodiment to the present invention.

As mentioned above, the cross-polarization correction generally varies based upon the scan angle and the frequency of the signals transmitted and/or received by the antenna. In order to determine the appropriate cross-polarization correction, the antenna 32 is typically analyzed at a plurality of scan angles and, if desired, a plurality of frequencies to determine the internal cross-polarization coupling that occurs and is preferably cancelled. In this regard, an antenna permits internal cross-polarization coupling as defined by a polarization coupling matrix C, having components designated $c_{11}$, $c_{12}$, $c_{21}$ and $c_{22}$, is shown in FIG. 8 without any cross-polarization cancellation. In instances in which the antenna is configured to transmit signals, the orthogonally polarized inputs $T_1$ and $T_2$ are related to the signals that are output by the dual orthogonally polarized radiating elements $\vec{p}_1$ and $\vec{p}_2$ as follows:

$\vec{p}_1 = [T_1 c_{11} + T_2 c_{12}] \vec{p}_1$
$\vec{p}_2 = [T_1 c_{21} + T_2 c_{22}] \vec{p}_2$ \quad (8)

By providing an input signal at one port of the antenna while terminating or grounding the other port, and by measuring the outputs of the antenna ($V_1$, $V_2$) the co- and cross-polarization components may be determined at the peak of the beam transmitted by the antenna 32. In this regard, the components of the polarization matrix C can be determined as follows:

$c_{11} = V_1/T_1|_{T_2=0} \quad c_{21} = V_2/T_2|_{T_2=0}$ $c_{21} = V_1/T_2|_{T_1=0} \quad c_{22} = V_2/T_2|_{T_1=0}$ As described above, the cross-polarization cancellation matrix D is simply the inverse of the polarization matrix C.

Thus, the coefficients of the cross-polarization cancellation matrix D may be readily determined based upon the polarization matrix coefficients determined in the manner described above. While these coefficients may be separately determined at each scan angle and at each frequency of interest, the coefficients are generally slowly varying and a well-behaved function of scan angle and frequency. As such, the coefficients may be determined at a few angles and frequencies and the coefficients for angles and frequencies other than those at which the coefficients were specifically determined may be calculated by interpolation. In addition, the variation of the coefficients based upon changes in the frequency is typically relatively minor and may therefore be ignored in some embodiments without nullifying the efficacy of the cross-polarization cancellation technique of the present invention at satellite communication bandwidths. The coefficients of the cross-polarization matrix D that is determined as described above may then be stored in a memory device and accessed by a processor, a controller or the like during operation in order to properly adjust the amplitude and shift the phase of the signals applied to or received by the antenna. Accordingly, the internal cross-polarization coupling of the antenna may be effectively cancelled.

While the foregoing embodiments of the antenna system 30 provide open loop control, the antenna system 58 may instead include closed loop control. In this regard, the antenna system may include both a transmission antenna 60 and a reception antenna 62, each of which are dual orthogonally polarized antennas. In addition, each antenna permits internal cross-polarization coupling between the orthogonally polarized signals. According to this embodiment of the present invention, the antenna system includes first and second cross-polarization cancellation elements 64, 66 associated with the reception and transmission antennas, respectively. While various types of cross-polarization cancellation elements may be employed, such as those described above and depicted in FIGS. 5–7, the antenna system of the illustrated embodiment includes first and second cross-polarization cancellation elements as described above in conjunction with FIG. 7. Regardless of the embodiment of the cross-polarization cancellation elements, each cross-polarization cancellation element includes a delta ($\Delta$) port and a sum ($\Sigma$) port. With respect to the transmission antenna, the delta port is frequently terminated with a matched load and the signal to be transmitted is generally provided via the sum port. Additionally, the antenna system of this embodiment includes a processor 68 for setting the phase shift imparted by the phase shifter 52 of the first cross-polarization cancellation element and, the amplitude adjustment provided by the adjustable amplifiers 50 of the first cross-polarization cancellation element. As an aside, it is note that the amplifiers 50 combined with two 90° hybrids provide an equivalent variable attenuator or power divider configuration. Preferably, the processor sets the relative phase shift and adjusts the relative amplitude between the reception antenna outputs in an iterative manner until a null is provided at the delta port in response to a signal of given polarization received by the reception antenna and presented at the antenna terminals. While nulling at the delta port, the signal power is simultaneously maximized at the sum port Looking from the sum port, the network 64 can be seen to compensate for the cross-coupling and any other polarization distorting effects occurring within the reception antenna. Once the appropriate phase shift and amplitude adjustment have been determined, the processor directs the phase shifters 52 and amplifiers 50 of the second cross-polarization cancellation element to provide the same relative phase shifts and relative amplitude adjustments in the transmit antenna such that the signal radiated by the transmitted antenna has a polarization matched to that incident at the reception antenna. In this regard, it is assumed that the transmit and receive phased array antennas have similar type radiating elements and have similar element lattice and spacing relative to wavelength and that both transmit and receive antennas are pointed at the same source, such as a satellite. By adaptively configuring the first and second cross-polarization correction elements 64, 66 as described above, the polarization of the signals transmitted by the transmission antenna 60 will be colinear with the field vector incident on the reception antenna 62. Advantageously, the closed loop technique for configuring the first and second cross-polarization cancellation elements does not require knowledge of the polarization characteristics of the antennas as a function of scan angle or frequency.

Accordingly, the antenna system and associated method of the present invention provides active correction for internal coupling between the orthogonally polarized signals permitted by the dual orthogonally polarized antenna, such as a phased array antennas. As such, the antenna can transmit and/or receive dual orthogonally polarized signals across a full range of scan angles without concern as to the degradation of the polarization purity of the signals. Additionally, the antenna system of the present invention provides active polarization correction without substantially increasing the cost of the antenna system and without significantly impacting the size or packaging requirements of the antenna.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An antenna system comprising:
a dual orthogonally polarized antenna capable of supporting propagation of signals have two orthogonal polarizations, said antenna having different predetermined amounts of internal coupling between the orthogonally polarized signals at different scan angles, wherein said antenna comprises a pair of input/output ports for providing signals having a respective polarization, and
a cross-polarization cancellation element associated with said antenna for modifying the orthogonally polarized signals to compensate for the internal coupling, said cross-polarization cancellation element differently modifying the orthogonally polarized signals at different scan angles based upon the different predetermined amounts of internal coupling between the orthogonally polarized signals at different scan angles, wherein said cross-polarization cancellation element is connected to said pair of input/output ports.

2. An antenna system according to claim 1 further comprising a memory device for storing data representing modifications to be provided by said cross-polarization cancellation element to the orthogonally polarized signals at different scan angles.

3. An antenna system according to claim 2 wherein said memory device stores the data that is also dependent upon frequency of the orthogonally polarized signals.

4. An antenna system comprising:
a dual orthogonally polarized antenna capable of supporting propagation of signals have two orthogonal polarizations, said antenna having different predetermined amounts of internal coupling between the orthogonally polarized signals at different scan angles, wherein said dual orthogonally polarized antenna is a phased array antenna comprising a plurality of modules, each module comprising a pair of dual orthogonally polarized radiating elements, and
a plurality of cross-polarization cancellation elements associated with respective modules of said phased array antenna for modifying the orthogonally polarized signals to compensate for the internal coupling, said cross-polarization cancellation element differently modifying the orthogonally polarized signals at different scan angles based upon the different predetermined amounts of internal coupling between the orthogonally polarized signals at different scan angles.

5. An antenna system comprising:
a dual orthogonally polarized antenna capable of supporting propagation of signals have two orthogonal polarizations, said antenna having different predetermined amounts of internal coupling between the orthogonally polarized signals at different scan angles, wherein said dual orthogonally polarized antenna comprises first and second input/output ports for providing signals having a respective polarization, and
a cross-polarization cancellation element associated with said antenna for modifying the orthogonally polarized signals to compensate for the internal coupling, said cross-polarization cancellation element differently modifying the orthogonally polarized signals at different scan angles based upon the different predetermined amounts of internal coupling between the orthogonally polarized signals at different scan angles, wherein said cross-polarization cancellation element is connected to said first and second input/output ports, said cross-polarization cancellation element comprising a first leg extending from said first input/output port to said second input/output port and a second leg extending from said second input/output port to said first input/output port, each leg comprising an adjustable amplifier and an adjustable phase shifter for controllably adjusting the amplitude and phase, respectively, of the signals diverted from one input/output port to the other input/output port in order to compensate for the internal coupling between the orthogonally polarized signals permitted by said dual orthogonally polarized antenna.

6. An antenna system comprising:
a dual orthogonally polarized antenna capable of supporting propagation of signals have two orthogonal polarizations, said antenna having different predetermined amounts of internal coupling between the orthogonally polarized signals at different scan angles, wherein said dual orthogonally polarized antenna comprises first and second input/output ports for providing signals having a respective polarization, and
a cross-polarization cancellation element associated with said antenna for modifying the orthogonally polarized signals to compensate for the internal coupling, said cross-polarization cancellation element differently modifying the orthogonally polarized signals at different scan angles based upon the different predetermined amounts of internal coupling between the orthogonally polarized signals at different scan angles, wherein said cross-polarization cancellation element is connected to said first and second input/output ports, said cross-polarization cancellation element comprising first and second legs connected to said first and second input/output ports, respectively, each leg comprising an adjustable amplifier and an adjustable phase shifter for controllably adjusting the amplitude and phase, respectively, of the signals at the respective input/output port in order to compensate for the internal coupling between the orthogonally polarized signals permitted by said dual orthogonally polarized antenna.

7. An antenna system comprising:

a dual orthogonally polarized antenna capable of supporting propagation of signals have two orthogonal polarizations, said antenna having different predetermined amounts of internal coupling between the orthogonally polarized signals at different scan angles, wherein said dual orthogonally polarized antenna comprises first and second input/output ports for providing signals having a respective polarization, and a cross-polarization cancellation element associated with said antenna for modifying the orthogonally polarized signals to compensate for the internal coupling, said cross-polarization cancellation element differently modifying the orthogonally polarized signals at different scan angles based upon the different predetermined amounts of internal coupling between the orthogonally polarized signals at different scan angles, wherein said cross-polarization cancellation element is connected to said first and second input/output ports, said cross-polarization cancellation element comprising first and second legs connected to said first and second input/output ports, respectively, each leg comprising an adjustable amplifier and an adjustable phase shifter for controllably adjusting the amplitude and phase, respectively, of the signals at the respective input/output port, said first and second legs further comprising at least one quadrature hybrid connected therebetween such that said cross-polarization cancellation element is capable of compensating for the internal coupling between the orthogonally polarized signals permitted by said dual orthogonally polarized antenna.

8. An antenna system comprising:

a reception antenna comprising a pair of input/output ports for receiving signals having two orthogonal polarizations, said reception antenna permitting different amounts of internal coupling between the orthogonally polarized signals at different scan angles;

a transmission antenna comprising a pair of input/output ports for transmitting signals having two orthogonal polarizations, said transmission antenna permitting different amounts of internal coupling between the orthogonally polarized signals at different scan angles;

first and second cross-polarization cancellation elements associated with said pair of input/output ports of said reception and transmission antennas, respectively, for modifying the orthogonally polarized signals to compensate for the internal coupling, each cross-polarization cancellation element differently modifying the orthogonally polarized signals at different scan angles based upon the different amounts of internal coupling between the orthogonally polarized signals at different scan angles, each cross-polarization cancellation element comprising a delta port and a sum port, each cross-polarization cancellation element further comprising at least one phase shifter for modifying the phase of at least some of the orthogonally polarized signals; and a processor for setting the phase shift imparted by said at least one phase shifter of said first cross-polarization cancellation element such that a null is provided at the delta port, said processor also setting the phase shift imparted by said at least one phase shifter of said second cross-polarization cancellation element to impart the same phase shift as the phase shift imparted by said at least one phase shifter of said first cross-polarization cancellation element.

9. An antenna system according to claim 8 wherein said processor iteratively adjusts the phase shift imparted by said at least one phase shifter of said first cross-polarization cancellation element until a null is provided at the delta port.

10. An antenna system according to claim 8 wherein each cross-polarization cancellation element further comprises an adjustable amplifier for controllably adjusting the amplitude of at least some of the orthogonally polarized signals.

11. An antenna system according to claim 10 wherein each cross-polarization cancellation element further comprising first and second legs connected to said first and second input/output ports, respectively, of the respective antenna, each leg comprising an adjustable amplifier and an adjustable phase shifter for controllably adjusting the amplitude and phase, respectively, of the signals at the respective input/output port, said first and second legs further comprising at least one quadrature hybrid connected therebetween such that said cross-polarization cancellation element is capable of compensating for the internal coupling between the orthogonally polarized signals permitted by the respective antenna.

12. An antenna system according to claim 8 wherein the sum port of said second cross polarization cancellation element is adapted to receive signals to be transmitted by said transmission antenna.

13. An antenna system according to claim 8 wherein said reception antenna and said transmission antenna are each a phased array antenna.

14. A method for providing cross-polarization cancellation for an antenna system comprising reception and transmission antennas that each include a pair of input/output ports for receiving signals and transmitting signals, respectively, having two orthogonal polarizations, each antenna permitting different amounts of internal coupling between the orthogonally polarized signals at different scan angles, wherein the antenna system further comprises first and second cross-polarization cancellation elements associated with said pair of input/output ports of said reception and transmission antennas, respectively, for differently modifying the orthogonally polarized signals at different scan angles to compensate for the different amounts of internal coupling at the different scan angles, each cross-polarization cancellation element comprising a delta port and a sum port, and wherein the method comprises:

receiving orthogonally polarized signals with the reception antenna;

selectively shifting the phase of the received signals with the first cross-polarization cancellation element such that a null is provided at the delta port;

setting the phase shift imparted by the second cross-polarization cancellation element to impart the same phase shift upon the transmitted signals as the phase shift imparted upon the received signals by the first cross-polarization cancellation element; and transmitting orthogonally polarized signals with the transmission antenna once the phase shift imparted upon the transmitted signals by the second cross-polarization cancellation element is set, wherein transmitting orthogonally polarized signals comprises differently modifying the orthogonally polarized signals at different scan angles with the second cross-polarization cancellation element associated with the pair of input/output Ports of the transmission antenna to thereby compensate for the different amounts of internal coupling at the different scan angles.

15. A method according to claim 14 further comprising selectively amplifying the received signals with the first cross-polarization cancellation element concurrent with the selective shifting of the phase of the received signals such that a null is provided at the delta port.

16. A method according to claim 15 further comprising setting the amplification imparted by the second cross-polarization cancellation element to impart the same amplification upon the transmitted signals as the amplification imparted upon the received signals by the first cross-polarization cancellation element.

17. A method according to claim 15 wherein selectively shifting the phase of and selectively amplifying the received signals with the first cross-polarization cancellation element comprise iteratively shifting the phase of and iteratively adjusting the amplification of the received signals until a null is provided at the delta port.

18. A method according to claim 14 further comprising providing signals to be transmitted by the transmission antenna to the sum port of the second cross-polarization cancellation element.

* * * * *